(12) United States Patent
Sandate Aguilar et al.

(10) Patent No.: US 9,482,839 B2
(45) Date of Patent: Nov. 1, 2016

(54) OPTICAL FIBER CABLE WITH ANTI-SPLIT FEATURE

(71) Applicant: Corning Cable Systems LLC, Hickory, NC (US)

(72) Inventors: Mario Sergio Sandate Aguilar, Reynosa (MX); Michael John Gimblet, Conover, NC (US); Julian Latelle Greenwood, III, Hickory, NC (US); Warren Welborn McAlpine, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 0 days.

(21) Appl. No.: 14/099,921

(22) Filed: Dec. 7, 2013

(65) Prior Publication Data

US 2015/0043874 A1    Feb. 12, 2015

Related U.S. Application Data

(60) Provisional application No. 61/864,104, filed on Aug. 9, 2013.

(51) Int. Cl.
*G02B 6/44* (2006.01)

(52) U.S. Cl.
CPC ............ *G02B 6/4433* (2013.01); *G02B 6/441* (2013.01); *G02B 6/4413* (2013.01); *G02B 6/4432* (2013.01); *G02B 6/4434* (2013.01);
(Continued)

(58) Field of Classification Search
CPC ............................ G02B 6/441; G02B 6/4433
See application file for complete search history.

(56) References Cited

U.S. PATENT DOCUMENTS 3,076,235 A    2/1963  Rollins et al.
3,087,007 A *  4/1963  Jachimowicz ............ 174/110 R
(Continued)

FOREIGN PATENT DOCUMENTS

DE    4421456 A1   12/1995   ............. B29C 47/02
EP         g02 b    4/1995   ............... G02B 6/44
(Continued)

OTHER PUBLICATIONS

U.S. Appl. No. 13/445,517, filed Apr. 12, 2012, Eric R. Logan, 29 pages.
(Continued)

*Primary Examiner* — Rhonda Peace
(74) *Attorney, Agent, or Firm* — William D. Doyle (57) ABSTRACT

An optical communication cable includes a jacket, optical transmission elements, and armor. The jacket is mostly formed from a first material and includes an elongate member formed from a second material embedded in the first material. The jacket defines a channel in which the optical transmission elements are located. The armor includes a wrapped sheet having a lateral edge and is positioned around the optical transmission elements within the channel. The elongate member has an inner surface aligned with and located exterior to the lateral edge of the armor; and, when viewed in cross-section, the elongate member fully overlays and extends tangentially beyond the lateral edge. Accordingly, the elongate member provides an obstacle in the jacket that limits zippering through the jacket originating from the lateral edge. Further, the elongate member may double as a tear feature for quickly accessing contents of the cable interior to the jacket.

20 Claims, 6 Drawing Sheets

(52) U.S. Cl.
CPC .......... *G02B6/4435* (2013.01); *G02B 6/4494* (2013.01); *G02B 6/4495* (2013.01)

(56) References Cited

U.S. PATENT DOCUMENTS

| | | | |
|---|---|---|---|
| 3,991,014 A | 11/1976 | Kleinschuster | 260/47 |
| 4,067,852 A | 1/1978 | Calundann | 260/47 |
| 4,075,419 A * | 2/1978 | Virkus | 174/107 |
| 4,083,829 A | 4/1978 | Calundann et al. | 260/47 |
| 4,130,545 A | 12/1978 | Calundann | 260/40 P |
| 4,237,337 A | 12/1980 | Serrander | 174/70 R |
| 4,241,979 A | 12/1980 | Gagen et al. | |
| 4,248,824 A | 2/1981 | Hattop | 264/171 |
| 4,318,842 A | 3/1982 | East et al. | 524/605 |
| 4,456,331 A | 6/1984 | Whitehead et al. | 350/96.23 |
| 4,468,364 A | 8/1984 | Ide | 264/176 R |
| 4,496,214 A | 1/1985 | Oestreich et al. | |
| 4,515,435 A | 5/1985 | Anderson | |
| 4,535,098 A | 8/1985 | Evani et al. | |
| 4,707,074 A | 11/1987 | Heywood | 350/96.23 |
| 4,729,628 A | 3/1988 | Kraft et al. | 350/96.23 |
| 4,730,894 A | 3/1988 | Arroyo | |
| 4,767,184 A | 8/1988 | Ogasawara et al. | |
| 4,796,970 A | 1/1989 | Reeve et al. | |
| 4,848,868 A | 7/1989 | Rohner | 350/96.23 |
| 4,930,860 A | 6/1990 | Tansey et al. | |
| 4,973,611 A | 11/1990 | Puder | |
| 4,993,804 A | 2/1991 | Mayr et al. | |
| 5,039,197 A | 8/1991 | Rawlyk | |
| 5,155,789 A | 10/1992 | Le Noane et al. | |
| 5,157,752 A | 10/1992 | Greveling et al. | |
| 5,173,961 A | 12/1992 | Chiasson | |
| 5,179,611 A | 1/1993 | Umeda et al. | |
| 5,218,659 A | 6/1993 | Schneider | 385/110 |
| 5,233,678 A | 8/1993 | Katurashima et al. | |
| 5,360,497 A | 11/1994 | Schneider et al. | 156/47 |
| 5,388,175 A | 2/1995 | Clarke | |
| 5,440,660 A | 8/1995 | Dombrowski et al. | |
| 5,442,722 A | 8/1995 | DeCarlo | 385/114 |
| 5,621,841 A | 4/1997 | Field | |
| 5,636,308 A | 6/1997 | Personne et al. | 385/102 |
| 5,651,081 A | 7/1997 | Blew et al. | 385/101 |
| 5,671,312 A | 9/1997 | Jamet | |
| 5,684,904 A | 11/1997 | Bringuier et al. | |
| 5,689,601 A | 11/1997 | Hager et al. | |
| 5,703,983 A | 12/1997 | Beasley | |
| 5,717,805 A | 2/1998 | Stulpin | 385/114 |
| 5,737,470 A | 4/1998 | Nagano et al. | 385/114 |
| 5,777,271 A * | 7/1998 | Carlson et al. | 174/107 |
| 5,930,431 A * | 7/1999 | Lail et al. | 385/100 |
| 5,970,196 A | 10/1999 | Greveling et al. | 385/114 |
| 5,987,204 A | 11/1999 | Lee et al. | 385/100 |
| 6,041,153 A | 3/2000 | Yang | 385/109 |
| 6,088,499 A | 7/2000 | Newton et al. | 385/112 |
| 6,137,936 A | 10/2000 | Fitz et al. | 385/113 |
| 6,167,180 A | 12/2000 | Keller | 385/113 |
| 6,185,352 B1 | 2/2001 | Hurley | |
| 6,193,824 B1 | 2/2001 | Einsle et al. | |
| 6,195,486 B1 * | 2/2001 | Field et al. | 385/100 |
| 6,215,931 B1 | 4/2001 | Risch et al. | |
| 6,222,969 B1 | 4/2001 | Botelho et al. | 385/114 |
| 6,304,701 B1 | 10/2001 | Bringuier et al. | |
| 6,311,000 B1 | 10/2001 | Schneider | 385/113 |
| 6,318,061 B1 | 11/2001 | Schneider et al. | |
| 6,334,015 B2 | 12/2001 | Jamet | |
| 6,351,589 B1 | 2/2002 | Leggett | 385/128 |
| 6,404,962 B1 | 6/2002 | Hardwick, III et al. | 385/114 |
| 6,483,971 B2 | 11/2002 | Gaillard et al. | |
| 6,487,346 B2 | 11/2002 | Nothofer | |
| 6,519,396 B2 | 2/2003 | Schneider et al. | 385/101 |
| 6,542,674 B1 | 4/2003 | Gimblet | 385/113 |
| 6,545,222 B2 | 4/2003 | Yokokawa et al. | 174/110 R |
| 6,546,176 B2 | 4/2003 | Anderson et al. | 385/113 |
| 6,546,712 B2 | 4/2003 | Moss et al. | |
| 6,563,991 B1 | 5/2003 | Witt et al. | 385/107 |
| 6,597,844 B1 | 7/2003 | Witt et al. | |
| 6,603,908 B2 | 8/2003 | Dallas et al. | 385/109 |
| 6,639,152 B2 | 10/2003 | Glew et al. | |
| 6,658,184 B2 | 12/2003 | Bourget et al. | |
| 6,661,956 B2 * | 12/2003 | Yamasaki et al. | 385/109 |
| 6,704,481 B2 | 3/2004 | Gaillard et al. | 385/113 |
| 6,721,480 B1 | 4/2004 | Bocanegra et al. | |
| 6,728,455 B2 | 4/2004 | Kusakari et al. | 385/113 |
| 6,760,522 B2 | 7/2004 | Okada et al. | 385/109 |
| 6,760,523 B2 | 7/2004 | Nechitailo | |
| 6,766,091 B2 | 7/2004 | Beuth et al. | 385/128 |
| 6,798,958 B2 | 9/2004 | Bourget et al. | |
| 6,813,421 B2 | 11/2004 | Lail et al. | 385/101 |
| 6,856,748 B1 | 2/2005 | Elkins, II et al. | |
| 6,870,995 B2 | 3/2005 | Johnson et al. | |
| 6,876,798 B2 | 4/2005 | Triplett et al. | 385/100 |
| 6,901,191 B2 | 5/2005 | Hurley et al. | |
| 6,912,347 B2 | 6/2005 | Rossi et al. | |
| 6,931,190 B2 | 8/2005 | Ino et al. | |
| 6,937,802 B2 | 8/2005 | Jamet et al. | |
| 6,957,000 B2 | 10/2005 | McAlpine et al. | 385/102 |
| 6,973,246 B2 | 12/2005 | Bocanegra et al. | |
| 7,029,137 B2 | 4/2006 | Lionetti et al. | 362/84 |
| 7,050,685 B2 | 5/2006 | Plemmons et al. | 385/109 |
| 7,082,241 B2 | 7/2006 | Jamet et al. | |
| 7,085,459 B2 | 8/2006 | Conrad et al. | 385/114 |
| 7,116,872 B2 | 10/2006 | Okuno et al. | 385/114 |
| 7,123,801 B2 | 10/2006 | Fitz | 385/105 |
| 7,136,556 B2 | 11/2006 | Brown et al. | 385/102 |
| 7,187,830 B2 | 3/2007 | Blazer | 385/114 |
| 7,197,215 B2 | 3/2007 | Baird et al. | 385/113 |
| 7,200,307 B2 | 4/2007 | Bau' et al. | |
| 7,212,715 B2 | 5/2007 | Dallas et al. | |
| 7,218,821 B2 | 5/2007 | Bocanegra et al. | 385/103 |
| 7,225,534 B2 | 6/2007 | Kachmar | 29/825 |
| 7,242,830 B2 | 7/2007 | Storaasli et al. | |
| 7,242,831 B2 | 7/2007 | Fee | |
| 7,251,411 B1 | 7/2007 | Lu et al. | 385/147 |
| 7,321,709 B2 | 1/2008 | Yokokawa et al. | |
| 7,346,244 B2 | 3/2008 | Gowan et al. | 385/113 |
| 7,359,600 B2 | 4/2008 | Kim et al. | |
| 7,373,057 B2 | 5/2008 | Pizzorno et al. | |
| 7,379,642 B2 | 5/2008 | Kachmar | 385/102 |
| 7,391,943 B2 | 6/2008 | Blazer et al. | 385/100 |
| 7,400,810 B2 | 7/2008 | Tanaka et al. | 385/134 |
| 7,403,685 B2 | 7/2008 | Wells | 385/100 |
| 7,415,181 B2 | 8/2008 | Greenwood et al. | 385/100 |
| 7,424,189 B2 | 9/2008 | Lu et al. | 385/100 |
| 7,431,963 B2 | 10/2008 | Konstadinidis et al. | |
| 7,471,862 B2 | 12/2008 | Bringuier et al. | 385/113 |
| 7,480,436 B2 | 1/2009 | Wells et al. | 385/134 |
| 7,489,843 B2 | 2/2009 | Carlson et al. | 385/100 |
| 7,532,796 B2 | 5/2009 | Chiasson | 385/114 |
| 7,539,380 B1 | 5/2009 | Abernathy et al. | 385/100 |
| 7,567,741 B2 | 7/2009 | Abernathy et al. | 385/113 |
| 7,570,852 B2 | 8/2009 | Nothofer et al. | |
| 7,570,854 B2 | 8/2009 | Keller et al. | |
| 7,587,111 B2 | 9/2009 | de Montmorillon et al. | 385/127 |
| 7,590,321 B2 | 9/2009 | Lu et al. | 385/104 |
| 7,603,012 B1 | 10/2009 | Ice | 385/103 |
| 7,623,747 B2 | 11/2009 | De Montmorillon et al. | 385/124 |
| 7,630,605 B2 | 12/2009 | Bringuier et al. | |
| 7,693,375 B2 | 4/2010 | Freeland et al. | 385/100 |
| 7,742,667 B2 | 6/2010 | Paschal et al. | |
| 7,750,060 B2 | 7/2010 | Zahora et al. | |
| 7,755,027 B2 | 7/2010 | Browning, Jr. et al. | |
| 7,787,727 B2 | 8/2010 | Bringuier et al. | 385/113 |
| 7,796,853 B2 | 9/2010 | Abernathy et al. | 385/100 |
| 7,817,891 B2 | 10/2010 | Lavenne et al. | 385/109 |
| 7,970,247 B2 | 6/2011 | Barker | |
| 7,974,507 B2 | 7/2011 | Lovie et al. | |
| 7,995,886 B2 | 8/2011 | Pizzorno et al. | |
| 8,031,997 B2 | 10/2011 | Overton | |
| 8,041,167 B2 | 10/2011 | Overton | |
| 8,118,282 B2 | 2/2012 | Griffioen et al. | |
| 8,165,439 B2 | 4/2012 | Overton | |
| 8,175,434 B2 | 5/2012 | Davidson et al. | |

(56) References Cited

U.S. PATENT DOCUMENTS

| | | | |
|---|---|---|---|
| 8,180,190 B2 | 5/2012 | Bringuier et al. | |
| 8,189,974 B2 | 5/2012 | Hashimoto et al. | |
| 8,355,613 B2 | 1/2013 | Weimann | |
| 8,467,645 B2 | 6/2013 | Keller et al. | |
| 8,467,650 B2 | 6/2013 | Overton et al. | |
| 8,494,327 B2 | 7/2013 | Keller et al. | |
| 8,498,509 B2 | 7/2013 | Tatat | |
| 8,582,939 B2* | 11/2013 | Gimblet et al. | 385/100 |
| 8,620,124 B1 | 12/2013 | Blazer et al. | |
| 8,682,124 B2* | 3/2014 | Logan | 385/100 |
| 8,705,921 B2* | 4/2014 | Blazer et al. | 385/102 |
| 8,737,787 B2 | 5/2014 | Gimblet et al. | |
| 9,140,867 B1* | 9/2015 | Sandate Aguilar | G02B 6/441 |
| 2002/0041744 A1 | 4/2002 | Anelli et al. | |
| 2003/0012530 A1* | 1/2003 | Yamasaki et al. | 385/109 |
| 2003/0035635 A1 | 2/2003 | Chastain et al. | |
| 2003/0118295 A1 | 6/2003 | Lail et al. | |
| 2003/0123822 A1 | 7/2003 | Witt et al. | |
| 2003/0165310 A1 | 9/2003 | Moon et al. | |
| 2004/0240806 A1 | 12/2004 | Lail et al. | |
| 2004/0252954 A1 | 12/2004 | Ginocchio et al. | |
| 2006/0045443 A1 | 3/2006 | Blazer | 385/114 |
| 2006/0093268 A1 | 5/2006 | Zimmel | |
| 2006/0127016 A1 | 6/2006 | Baird et al. | 385/113 |
| 2006/0291787 A1 | 12/2006 | Seddon | 385/113 |
| 2008/0013899 A1 | 1/2008 | Gowan et al. | 385/113 |
| 2008/0193092 A1 | 8/2008 | Greenwood et al. | 385/113 |
| 2008/0273845 A1 | 11/2008 | Weimann | |
| 2009/0087148 A1 | 4/2009 | Bradley et al. | 385/76 |
| 2009/0116797 A1 | 5/2009 | Stingl et al. | |
| 2009/0214167 A1 | 8/2009 | Lookadoo et al. | |
| 2009/0274425 A1 | 11/2009 | Caldwell et al. | 385/102 |
| 2009/0274426 A1 | 11/2009 | Lail | 385/105 |
| 2009/0297104 A1 | 12/2009 | Kachmar | |
| 2009/0317039 A1 | 12/2009 | Blazer et al. | 385/107 |
| 2009/0324182 A1 | 12/2009 | Kachmar et al. | 385/104 |
| 2010/0067856 A1 | 3/2010 | Knoch et al. | |
| 2010/0119202 A1 | 5/2010 | Overton | |
| 2010/0132973 A1 | 6/2010 | Fitz et al. | 174/102 R |
| 2010/0150505 A1 | 6/2010 | Testu et al. | |
| 2010/0189399 A1 | 7/2010 | Sillard et al. | |
| 2010/0202741 A1 | 8/2010 | Ryan et al. | |
| 2011/0091171 A1 | 4/2011 | Tatat et al. | |
| 2011/0110635 A1 | 5/2011 | Toge et al. | |
| 2011/0135816 A1 | 6/2011 | Burns et al. | |
| 2011/0194825 A1 | 8/2011 | Parris | |
| 2011/0217010 A1 | 9/2011 | Kachmar | 385/111 |
| 2011/0229098 A1 | 9/2011 | Abernathy et al. | 385/102 |
| 2011/0268398 A1 | 11/2011 | Quinn et al. | |
| 2012/0063731 A1 | 3/2012 | Fitz et al. | |
| 2012/0099825 A1 | 4/2012 | Messer | |
| 2012/0257864 A1 | 10/2012 | Consonni et al. | |
| 2012/0281953 A1 | 11/2012 | Choi et al. | |
| 2013/0051743 A1 | 2/2013 | Gimblet et al. | |
| 2013/0058614 A1 | 3/2013 | Gimblet et al. | |
| 2013/0094821 A1* | 4/2013 | Logan | 385/100 |
| 2013/0108226 A1* | 5/2013 | Gimblet et al. | 385/100 |
| 2014/0029903 A1* | 1/2014 | Blazer et al. | 385/102 |
| 2014/0086543 A1 | 3/2014 | Blazer et al. | |
| 2015/0043874 A1* | 2/2015 | Sandate Aguilar et al. | 385/100 |
| 2015/0110451 A1 | 4/2015 | Blazer et al. | |
| 2015/0355426 A1* | 12/2015 | Aguilar | G02B 6/441 385/110 |
| 2015/0378119 A1* | 12/2015 | Granger | B29D 11/00663 385/110 |

FOREIGN PATENT DOCUMENTS

| | | | | |
|---|---|---|---|---|
| EP | 749129 | A1 | 12/1996 | H01B 7/00 |
| EP | 1255144 | A2 | 11/2002 | |
| EP | 1168024 | B1 | 6/2006 | G02B 6/44 |
| EP | 1376156 | B1 | 7/2006 | G02B 1/04 |
| EP | 1531352 | B1 | 12/2009 | |
| EP | 1610163 | B1 | 10/2011 | |
| EP | 1982222 | B1 | 6/2012 | |
| GB | 2064163 | A | 6/1981 | |
| GB | 2096343 | A | 10/1982 | |
| GB | 2336000 | A | 10/1999 | |
| JP | 60-91306 | A | 5/1985 | G02B 6/24 |
| JP | 63-120206 | U | 8/1988 | G02B 6/08 |
| JP | 3137607 | U | 6/1991 | |
| JP | 9-230184 | A | 9/1997 | G02B 6/44 |
| JP | 2005-148373 | A | 6/2005 | G02B 6/44 |
| JP | 2005-345622 | A | 12/2005 | G02B 6/44 |
| JP | 2006-162703 | A | 6/2006 | G02B 6/44 |
| JP | 2006-171570 | A | 6/2006 | G02B 6/44 |
| JP | 2006-251769 | A | 9/2006 | G02B 6/44 |
| JP | 2006-251770 | A | 9/2006 | G02B 6/44 |
| JP | 2006-267600 | A | 10/2006 | G02B 6/44 |
| JP | 2007-272006 | A | 10/2007 | G02B 6/44 |
| JP | 2009-37150 | A | 2/2009 | G02B 6/44 |
| JP | 2009-258153 | A | 11/2009 | G02B 6/44 |
| JP | 201039018 | A | 2/2010 | |
| KR | 100288444 | B1 | 5/2001 | |
| KR | 20010045604 | A | 6/2001 | |
| KR | 2006-0081266 | | 7/2006 | G02B 6/44 |
| KR | 2006-0107414 | | 10/2006 | G02B 6/02 |
| KR | 101140219 | B1 | 5/2012 | |
| WO | 0121706 | A1 | 3/2001 | |
| WO | 02099491 | A1 | 12/2002 | |
| WO | 03/046074 | A1 | 6/2003 | C08L 23/16 |
| WO | 2004/021367 | A2 | 3/2004 | H01B 7/00 |
| WO | 2005/096053 | A1 | 10/2005 | G02B 6/44 |
| WO | 2006034722 | A1 | 4/2006 | |
| WO | 2006/097540 | A1 | 9/2006 | G02B 6/44 |
| WO | 2011/109498 | A2 | 9/2011 | |
| WO | 2011/137236 | A1 | 11/2011 | B29C 47/02 |
| WO | 2012047440 | A2 | 4/2012 | |
| WO | 2012/058181 | A1 | 5/2012 | G02B 6/44 |
| WO | 2012/071490 | A2 | 5/2012 | B29C 47/02 |
| WO | 2013130121 | A1 | 9/2013 | |
| WO | 2013172878 | A1 | 11/2013 | |

OTHER PUBLICATIONS

U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4$^{th}$ Version, Jul. 29, 2002, 56 pages.
Renka Corporation, Single Mode Optical Fiber Cable, Specification No. RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.
Patent Cooperation Treaty, International Search Report, PCT/US2014/049522, Mail date Feb. 9, 2015, 11 pages.
Hogan et al., Feb. 1998, "Optical Fiber Cables for Residential and Business Premises," Journal of Lightwave Technology, vol. 16, No. 2, pp. 207-213.
Marik, J., "Advanced SZ Stranding Technology for Enhanced Applications," 4 pages, Last accessed on Feb. 21, 2014 from http://rosendahlaustria.com/custom/rosendahl_austria/Rosendahl_Products_PDF/1062003111324_p1_.pdf.
Nextrom, "SZ Stranding Line OFC 70," 2 pages, Last accessed on Feb. 21, 2014 from http://www.nextrom.com/877_en_SZ-Stranding-Line.aspx.
Prysmian Cables & Systems, Oct. 5, 2005, "Glossary Excerpt from Prysmian's Wire and Cable Engineering Guide," Revision 3, pp. 1-40, Retrieved from www.prysmian.com.

(56) References Cited

OTHER PUBLICATIONS

Rechberger, M., Horschlager, W., "Buffering & SZ-Stranding Process for Compact Dry Tube FO-Cable," Proceedings of the 56th Annual International Wire & Cable Symposium, 2007, pp. 614-617.
Non-Final Rejection Response for 19 13/790,329, Mailing Date Oct. 11, 2013—20 pages.
Patent Cooperation Treaty Annex to Form PCT/ISA/206, Communication Relating to the Results of the Partial International Search, Application No. PCT/US2013/061133, Jan. 8, 2014, 3 pages.
Patent Cooperation Treaty, International Search Report, PCT/US2014/049522, mail date Feb 9, 2015, 11 pages.
U.S. Appl. No. 13/790,329, filed Mar. 8, 2013, Bradley J. Blazer, 48 pages.
U.S. Appl. No. 14/099,921, filed Dec. 7, 2013, Mario Sergio Sandate Aguilar, 35 pages.
U.S. Appl. No. 14/136,311, filed Dec. 20, 2013, Anne G. Bringuier, 22 pages.
U.S. Appl. No. 14/192,007, filed Feb. 27, 2014, Warren W. McAlpine, 18 pages.
U.S. Appl. No. 14/231,875, filed Apr. 1, 2014, Michael Emmerich, 38 pages.
U.S. Appl. No. 61/892,534, filed Oct. 18, 2013, Bradley J. Blazer, 42 pages.
U.S. Appl. No. 61/921,755, filed Dec. 30, 2013, David Wesley Chiasson, 42 pages.
U.S. Appl. No. 61/921,763, filed Dec. 30, 2013, William Carl Hurley, 45 pages.
U.S. Appl. No. 61/921,769, filed Dec. 30, 2013, Anne G. Bringuier, 30 pages.
U.S. Appl. No. 61/921,777, filed Dec. 30, 2013, Warren W. McAlpine, 56 pages.
USPTO, Non-Final Rejection for U.S. Appl. No. 13/790,329, Mailing Date Aug. 16, 2013, 12 pages.
USPTO, Notice of Allowance for U.S. Appl. No. 13/790,329, Mailing Date Nov. 12, 2013, 8 pages.

* cited by examiner

OPTICAL FIBER CABLE WITH ANTI-SPLIT FEATURE

RELATED APPLICATIONS

This application claims the benefit of priority under 35 U.S.C. §119 of U.S. Provisional Application Ser. No. 61/864,104 filed on Aug. 9, 2013, the content of which is relied upon and incorporated herein by reference in its entirety.

BACKGROUND

The disclosure relates generally to optical communication cables and more particularly to optical communication cables including one or more features configured to protect the cable body from interaction with components located within the cable jacket. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to optical communication cable that includes a jacket, optical transmission elements, and armor. The jacket is mostly formed from a first material and includes an elongate member formed from a second material embedded in the first material. The jacket defines a channel in which the optical transmission elements are located. The armor includes a wrapped sheet having a lateral edge and is positioned around the optical transmission elements within the channel. The elongate member has an inner surface aligned with and located exterior to the lateral edge of the armor; and, when viewed in cross-section, the elongate member fully overlays and extends tangentially beyond the lateral edge, such as extending at least 1% and/or no more than 20% of the interior perimeter of the channel beyond the lateral edge, such as at least 2% and/or no more than 15% tangentially beyond the lateral edge. Accordingly, the elongate member provides an obstacle in the jacket that limits zippering through the jacket originating from the lateral edge. Further, the elongate member may double as a tear feature for quickly accessing contents of the cable interior to the jacket.

Another embodiment of the disclosure relates to an optical communication cable including an extruded cable jacket formed from a first material. The cable includes a channel formed in the cable jacket and a plurality of optical transmission elements located within the channel. The cable includes armor (e.g., reinforcement sheet(s), corrugated metal) having a first lateral edge and an opposing second lateral edge, and the armor extends around the plurality of optical transmission elements such that the first lateral edge interfaces (e.g., overlaps, intermeshes, interlocks) the second lateral edge. The cable includes a first elongate member embedded in the first material of the cable jacket, such as being co-extruded therewith to form a cohesive composite jacket. The first elongate member has an inner surface and is formed from a second material. The inner surface of the first elongate member is aligned with and located exterior to the first lateral edge of the armor. The modulus of elasticity of the first material is different than the modulus of elasticity of the second material, and the second material is configured to resist split propagation through the cable jacket caused by the first lateral edge.

An additional embodiment of the disclosure relates to an optical communication cable including a plurality of optical transmission elements and armor. The armor includes a first lateral edge and an opposing second lateral edge, and the armor extends around the plurality of optical transmission elements such that the first lateral edge interfaces the second lateral edge creating an interface (e.g., overlapped portion). The cable includes a cable jacket that includes a main jacket portion, a secondary jacket portion, and a channel. The main jacket portion is formed from a first material and includes an inner surface and an outer surface defining an outer surface of the cable jacket. The secondary jacket portion is formed from a second material and includes an inner surface and is embedded within the main jacket portion. The channel extends through the cable jacket, and the channel is defined by both the inner surface of the main jacket portion and by the inner surface of the secondary jacket portion. The plurality of optical transmission elements and the armor are located within the channel. The secondary jacket portion extends part of the distance between the channel and the outer surface of the cable jacket such that a section of the main jacket portion is located between the secondary jacket portion and the outer surface of the cable jacket. The inner surface of the secondary jacket portion is aligned with the overlapped portion of the armor such that the inner surface of the secondary jacket portion is located between the overlapped portion of the armor and the outer surface of the cable jacket.

An additional embodiment of the disclosure relates to a fiber optic cable including a plurality of optical fibers and corrugated metal having a first lateral edge and an opposing second lateral edge. The corrugated metal surrounds the plurality of optical fibers, and the corrugated metal includes an overlapped portion formed from a portion of the corrugated metal adjacent the first lateral edge that extends over a portion of the corrugated metal adjacent the second lateral edge. The cable includes a cable jacket, and the cable jacket includes a main jacket portion formed from a first extruded polymer material. The main jacket portion includes an inner surface and an outer surface, and the outer surface defines an outer surface of the cable jacket. The cable jacket includes a secondary jacket portion formed from a second extruded polymer material, and the secondary jacket portion includes an inner surface. The secondary jacket portion is embedded within the main jacket portion. The cable jacket includes a channel extending through the cable jacket, and the channel is at least partially defined by the inner surface of the main jacket portion. The secondary jacket portion extends a portion of the distance between the channel and the outer surface of the cable jacket such that a section of the main jacket portion is located between the secondary jacket portion and the outer surface of the cable jacket. The inner surface of the secondary jacket portion is located exterior to and aligned with the overlapped portion of the corrugated metal. The modulus of elasticity of the first material is different than the modulus of elasticity of the second material.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include a cable jacket or body typically formed from a polymer material (e.g., a medium density polyethylene material). A group of optical fibers is surrounded by a protective, armor or reinforcement material (e.g., a corrugated metal sheet or sheets of material), and the armored group of optical fibers is positioned in a central channel of the cable jacket. Generally, the cable jacket provides physical support and protection to the optical fibers within the cable, and the armor material provides additional reinforcement to the optical fibers within the cable jacket.

The sheet or sheets of armor material includes an overlapped portion created by the overlapping of opposing edges of the armor material as the armor extends around the optical fibers. The overlapped section and, in particular, the exposed lateral edge of the upper portion of the overlap may contact the inner surface of the cable jacket that defines the channel of the cable jacket. This interaction or contact may tend to create a split within the cable jacket particularly upon twisting of the cable (such splitting may be referred to in the field as "cable zippering").

The cable jacket embodiments discussed herein include at least one protective member or feature positioned within the wall of the cable jacket that resists or prevents splitting caused by the armor overlap from compromising the integrity of the cable jacket. The protective member is positioned adjacent to and, in some embodiments, is in contact with the overlap of the armor material and/or the exposed lateral edge of the armor. The protective member may act to resist, limit or prevent split formation or split propagation that may otherwise be caused by the contact between the armor overlap and the material of the cable jacket.

In some embodiments, the material of the protective member may be more rigid than the primary material of the cable jacket. In such embodiments, the discontinuity at the interface of the two different materials may stop split propagation from continuing through to the outer surface of the cable jacket. In some other embodiments, the material of the protective member may be a compliant material that is less rigid than the primary material of the cable jacket. In such embodiments, the protective member may function as a compliant buffer that absorbs movement of the armor overlap rather than allowing a split to form in the primary material of the cable jacket.

In various embodiments discussed herein, the protective member may be formed along with the cable jacket in a single production step. For example, the protective member may be coextruded with the extruded material of the cable jacket. In such embodiments, the embedded protective member embodiments discussed herein may avoid the need for additional manufacturing steps to cover up or otherwise blunt the armor overlap.

Figure 1:
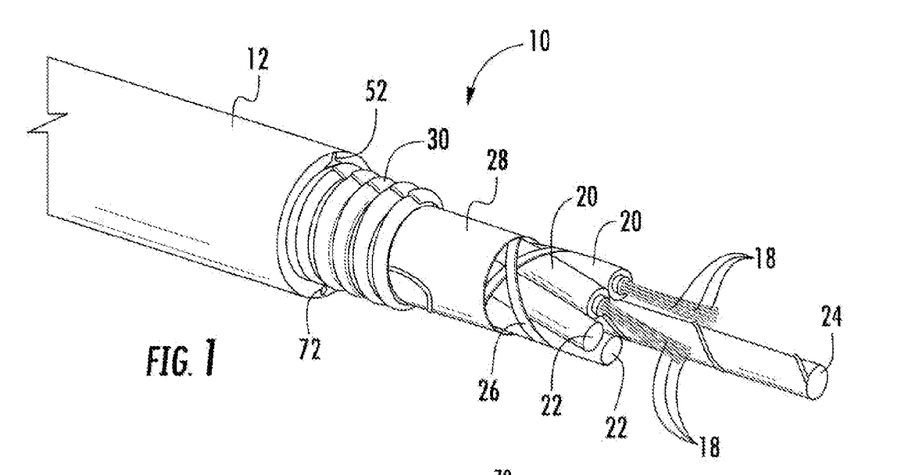
FIG. 1 is a perspective view of a fiber optic cable according to an exemplary embodiment.
Figure 2:
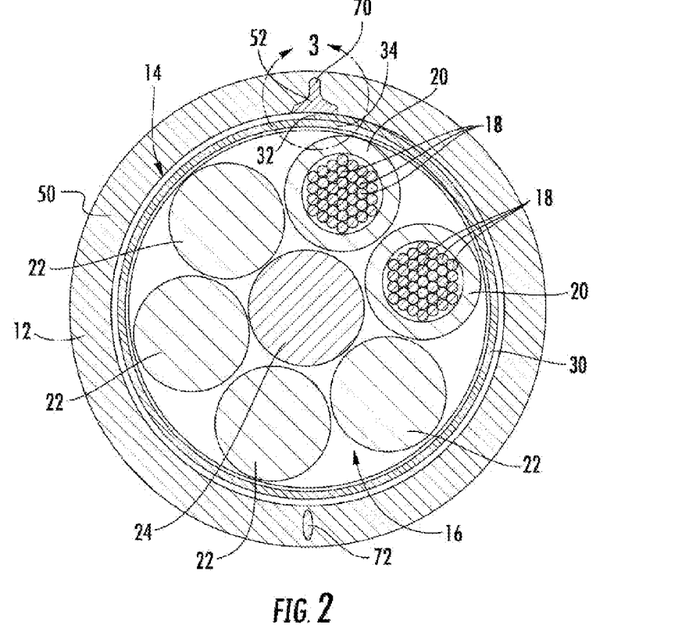
FIG. 2 is a cross-sectional view of the fiber optic cable of FIG. 1 according to an exemplary embodiment.

Referring to FIGS. 1 and 2, an optical communication cable, shown as cable 10, is shown according to an exemplary embodiment. Cable 10 includes a cable jacket, shown as cable jacket 12, having an inner surface 14 that defines a channel, shown as central bore 16. A plurality of optical transmission elements, shown as optical fibers 18, are located within bore 16. Generally, cable 10 provides structure and protection to optical fibers 18 during and after installation (e.g., protection during handling, protection from the elements, protection from vermin, etc.).

In the embodiment shown in FIGS. 1 and 2, bundles of optical fibers 18 are located within buffer tubes 20. One or more filler rods 22 are also located within bore 16. Filler rods 22 and buffer tubes 20 are arranged around a central support rod 24 formed from a material such as glass-reinforced plastic or metal. In some embodiments, helically wound binders 26 are wrapped around buffer tubes 20 and filler rods 22 to hold these elements in position around support rod 24. A barrier material, such as water barrier 28, is located around the wrapped buffer tubes 20 and filler rods 22. In other embodiments, a thin-film binder may be used, which may additionally be a water barrier.

An armor layer 30, is located outside of water barrier 28 or thin-film binder. Armor layer 30 extends around the interior elements (including optical fibers 18) of cable 10 such that armor layer 30 surround optical fibers 18. Armor layer 30 generally extends all or substantially all of the axial length of cable 10. Armor layer 30 generally provides an additional layer of protection to fibers 18 within cable 10, and may provide resistance against damage (e.g., damage caused by contact or compression during installation, damage from the elements, damage from rodents, etc.)

Figure 3:
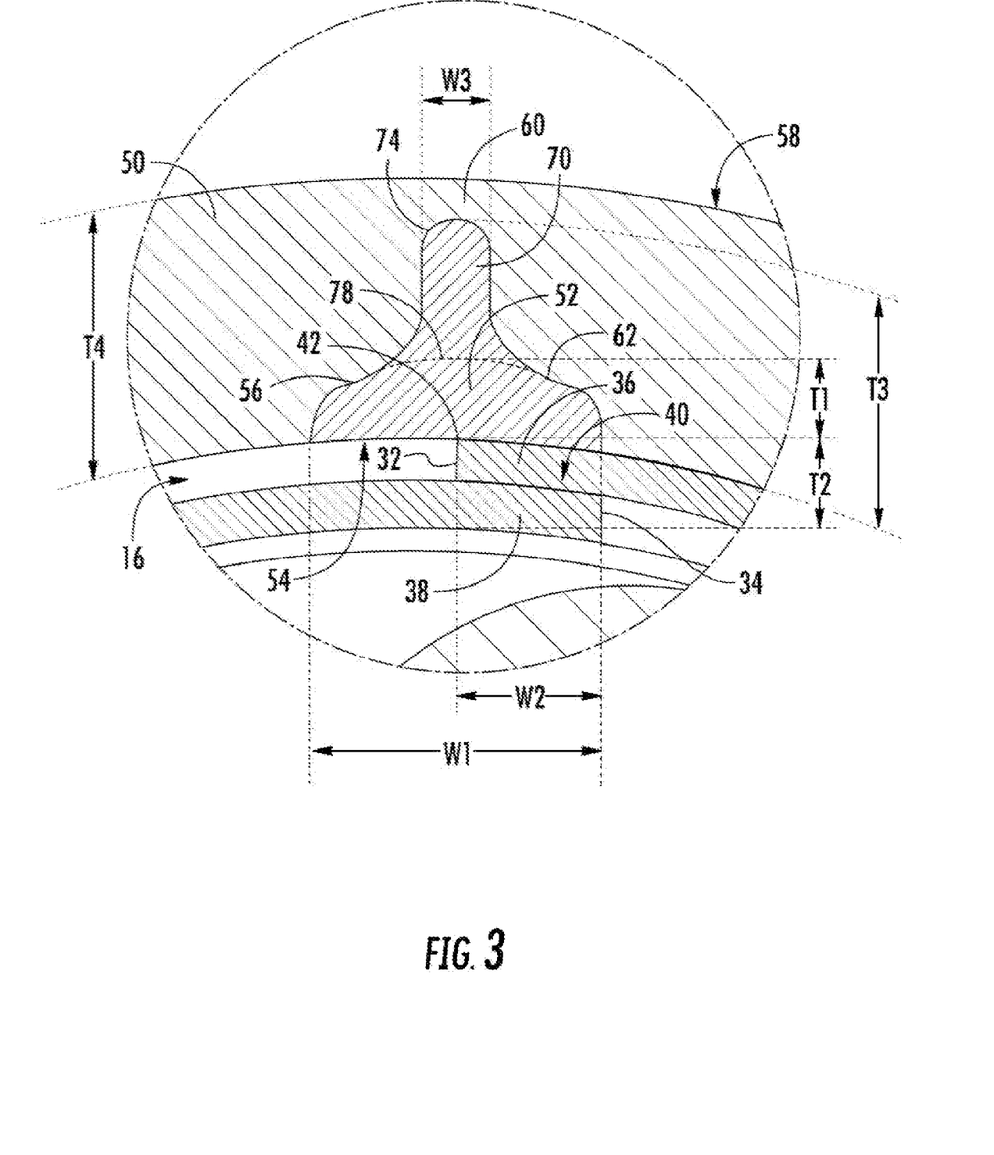
FIG. 3 is a detailed cross-sectional view of a portion of the fiber optic cable of FIG. 1 according to an exemplary embodiment.

As shown best in FIGS. 2 and 3, armor layer 30 has a first lateral edge 32 and a second lateral edge 34. In the embodiment shown, lateral edges 32 and 34 are substantially parallel to the longitudinal axis of cable 10 and of fibers 18. Referring to FIGS. 2 and 3, armor layer 30 is positioned such that first lateral edge 32 passes over or overlaps second lateral edge 34. In this arrangement, a section 36 of armor layer 30 adjacent first lateral edge 32 is located above a section 38 of armor layer 30 adjacent second lateral edge 34 forming an overlap portion 40. In one embodiment, an upper surface of section 38 is in contact with a lower surface of section 36 such that the thickness, T2 (i.e., the dimension in the radial direction shown in FIGS. 2 and 3) of overlap portion 40 is about twice the thickness the material of armor layer 30. With section 38 located below section 36, the upper corner 42 of lateral edge 32 defines the outer most corner of armor layer 30.

In various embodiments, armor layer 30 may be formed from a variety of strengthening or damage resistant materials. In the embodiment shown in FIG. 1, armor layer 30 is formed from a corrugated sheet of metal material having an alternating series of ridges and troughs. The corrugations may be oriented so that ridges formed thereby are directed away from the lengthwise axis of the cable. Further the sheets may be corrugated in a coordinated manner such that overlaying portions of the sheets have intermeshing features of the corrugations, thereby providing flexibility to the sheets in bending (via the corrugations in general) and coupling the sheets to one another via the intermeshing. In one embodiment, the corrugated metal is steel. In other embodiments, the corrugated metal may additionally serve as a ground conductor for the cable, such as with copper or aluminum armor. In other embodiments, other non-metallic strengthening materials may be used. For example, armor layer 30 may be formed from a fiberglass yarns (e.g., coated fiberglass yarns, rovings, etc.). In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.). In one embodiment, cable 10 could include a nylon 12 layer acting to resist termites.

Referring to FIGS. 2 and 3, cable jacket 12 generally includes a primary jacket portion 50 and a secondary jacket portion, shown as split resistant feature 52. Feature 52 is an elongate member or structure embedded within the material of primary jacket portion 50 of cable jacket 12. In various embodiments, feature 52 is a contiguous member that extends the length of cable jacket 12 between the first and second ends of the cable. In general, primary jacket portion 50 is made from a first material, and feature 52 is made from a second material that is different from the first material. Feature 52 includes an inner surface 54, and feature 52 is positioned such that inner surface 54 may be contiguous with inner surface 14 of cable jacket 12 such that inner surface 54 and inner surface 14 define channel 16. In one embodiment, feature 52 is coextruded along with primary jacket portion 50 such that the transition between inner surface 54 and inner surface 14 is a substantially smooth transition.

Feature 52 is positioned within primary jacket portion 50 such that inner surface 54 is aligned with and is generally adjacent to overlap portion 40, first lateral edge 32 and corner 42. Feature 52 is aligned with overlap portion 40, first lateral edge 32 and corner 42 such that inner surface 54 is located between overlap portion 40 and exterior surface 58 of cable jacket 12. In the embodiment shown in FIG. 3, inner surface 54 of feature 52 is located exterior to (i.e., above in the orientation of FIG. 3) overlap portion 40, first lateral edge 32 and corner 42. In a specific embodiment, inner surface 54 of feature 52 is in contact with the outer surface of overlap portion 40 and/or corner 42 of first lateral edge 32. In another embodiment, a layer of the material of jacket portion may be located between inner surface 54 of feature 52 and the outer surface of overlap portion 40 and corner 42 of first lateral edge 32. In such embodiments, even though inner surface 54 cannot directly contact overlap portion 40 because of the intervening material layer, such as when the feature 52 is fully embedded (i.e., completely surrounded when viewed in cross-section) in the primary jacket portion 50, inner surface 54 may be located a small distance (e.g., less than 1 mm or less than 0.5 mm) from the outer surface of overlap portion 40 and corner 42 of first lateral edge 32 such that split formation or propagation is resisted (see, e.g., FIG. 8).

Feature 52 acts to resist or prevent split formation or propagation within the material primary jacket portion 50 of cable jacket 12. In various embodiments, the material of primary jacket portion 50 may be susceptible to split formation if portions of armor overlap 40 contact the material of primary jacket portion 50. Such contact may occur during movements such as twisting movements typical during cable installation. However, in the embodiments discussed herein, feature 52 is sized, shaped, positioned and/or has certain material properties that allow feature 52 to prevent/limit/resist split formation or propagation. Thus, by positioning feature 52 as shown in FIG. 3, adjacent to overlap portion 40, feature 52 is able to interact with overlap 40 during movement of cable 10 and to resist split formation/propagation.

In a various embodiments, the width, W1, (i.e., the circumferential dimension in the circular embodiment of FIG. 2) of inner surface 54 of feature 52 is sized relative to the width, W2, of overlap 40 such that feature 52 remains aligned with overlap 40 even if rotation of armor layer 30 relative to cable jacket 12 occurs during jacket extrusion. In such embodiments, the width, W1, of inner surface 54 of feature 52 is greater than the width, W2, of overlap 40. In various embodiments, W1 is between 1 mm and 20 mm and specifically between 3 mm and 10 mm, and W2 is between 2 mm and 10 mm and specifically is between 3 mm and 5 mm. In round cables, the width W1 covers an arc length of at least 2° and/or less than 20°, such as at least 3° and/or less than 15°, about the center of the cable.

Feature 52 is positioned such that feature 52 does not extend all of the way through primary jacket portion 50 from channel 16 to outer surface 58 of cable 10. Thus, the thickness, T1, of feature 52 (i.e., the radial dimension of feature 52 in the circular embodiment of FIG. 2) is less than the thickness, T4, of primary jacket portion 50. In this embodiment, feature 52 extends from channel 16 outward a portion of the distance to outer surface 58 such that a section 60 of primary jacket portion 50 is located between an outermost surface 62 of feature 52 and outer cable surface 58.

In various embodiments, the material of feature 52 may be selected relative to the material of primary jacket portion 50 to resist/prevent split formation or propagation. In one embodiment, the modulus of elasticity of feature 52 may be greater than the modulus of elasticity of the material of primary jacket portion 50. In this embodiment, feature 52 may be formed from a material with relatively low bond strength to the material of primary jacket portion 50. In this embodiment, it is believed that the low bonding at interface 56 between feature 52 and primary jacket portion 50 will stop the propagation of a split that may be created within the material of feature 52 via interaction with overlap 40. By stopping split propagation at interface 56, a spilt is not permitted to extend through to outer surface 58 of cable jacket 12, and thus the feature 52 acts to maintain the wall of cable jacket 12 intact.

In such embodiments, the modulus of elasticity of the material of feature 52 is between 1.0 GPa and 2.0 GPa, specifically between 1.0 GPa and 1.5 GPa, and more specifically is about 1.2 GPa. In such embodiments, the modulus of elasticity of the material of primary jacket portion 50 is between 100 MPa and 800 MPa, specifically between 0.2

GPa and 0.4 GPa, and more specifically is about 0.31 GPa. In various embodiments, the modulus of elasticity of feature 52 is between 2 times and 10 times the modulus of primary jacket portion 50, specifically is between 3 times and 6 times the modulus of primary jacket portion 50, and more specifically is between 4 times the modulus of primary jacket portion 50.

In various such embodiments, primary jacket portion 50 is formed from an extruded polymer material, and feature 52 is formed from an extruded polymer material. In a specific embodiment, primary jacket portion 50 is formed from (e.g., comprises, consists at least 50% of by volume, includes as the major constituent) an extruded medium density polyethylene material (e.g., a polyethylene material having a density between 0.939 to 0.951 g/cm$^3$), and feature 52 is formed from an extruded polypropylene material. In a specific embodiment, feature 52 is formed from an extruded polypropylene material that includes a low percentage of polyethylene. The small amount of polyethylene within feature 52 provides sufficient bonding with the material of primary jacket portion 50 allowing for proper coextrusion of feature 52 and primary jacket portion 50, while maintaining sufficient dissimilarity and low bonding to cease split propagation at interface 56. In various embodiments, the material of feature 52 may include between 2% and 20% polyethylene, specifically between 5% and 15% polyethylene and more specifically about 9% polyethylene. In such embodiments, these combinations of polyethylene and polypropylene for feature 52 may act to provide sufficient discontinuity at interface 56 to limit split propagation while providing sufficient bonding between the material of feature 52 and the surrounding material.

In some embodiments, the primary jacket portion 50 includes polyethylene, such as where polyethylene is the major constituent of the primary jacket portion 50, such as where the primary jacket portion 50 mostly consists of polyethylene by volume, such as greater than 50% polyethylene by volume, at least 70% polyethylene by volume, etc. In some such embodiments, the feature 52 is formed from a highly-plasticized polymer, such as a highly-plasticized polyvinyl chloride, polyurethane, polypropylene, or other highly-plasticized polymer. Softness and flexibility provided by the plasticizer may mitigate crack initiation and propagation therethrough. In other embodiments, the feature 52 is formed from a highly-filled polymer, such as a highly filled polyvinyl chloride, polyurethane, polypropylene, or other highly-filled polymer. Particles of the filler material and interfaces between the particles and the base material may arrest or limit crack propagation through the polymer.

In the embodiments of cable 10 in which the modulus of feature 52 is greater than the modulus of primary jacket portion 50, the thickness of feature 52 may be less than the thickness of overlap portion 40 because in these embodiments split propagation is limited by the discontinuity of material at interface 56. In such embodiments, the thickness, T1, (i.e., the radial dimension in the circular embodiment of FIG. 3) of feature 52 is between 0.1 mm and 0.5 mm. In such embodiments, thickness, T2, of overlap 40 is between 0.2 mm and 1.1 mm. In a specific embodiment, armor layer 30 is formed from a corrugated metal material and thickness, T2, is between 0.6 mm and 1.2 mm, and more specifically is between 0.78 mm and 1.04 mm. In another specific embodiment, armor layer 30 is formed from a non-corrugated metal material, and thickness, T2, is between 0.2 mm and 0.4 mm, and more specifically is between 0.28 mm and 0.34 mm.

In other embodiments, the modulus of elasticity of feature 52 may be less than the modulus of elasticity of the material of primary jacket portion 50. In this embodiment, feature 52 may be formed from a compliant material. In this embodiment, it is believed that the compliant material with resist or prevent split formation by deforming upon interaction with overlap portion 40 acting as a buffer to prevent displacement and resulting split formation within the more rigid material of primary jacket portion 50.

In such embodiments, the modulus of elasticity of the material of feature 52 is between 10 MPa and 50 MPa, specifically between 15 MPa and 25 MPa, and more specifically between 18 MPa and 19 MPa; and/or no more than half that of the material of primary jacket portion 50, such as no more than a third that of the material of primary jacket portion 50, such as no more than a quarter that of the material of primary jacket portion 50. In such embodiments, the modulus of elasticity of the material of primary jacket portion 50 is between 0.1 GPa and 0.8 GPa, specifically between 0.2 GPa and 0.4 GPa, and more specifically is about 0.31 GPa. In various embodiments, primary jacket portion 50 is formed from an extruded polymer material, and feature 52 is formed from an extruded polymer material. In a specific embodiment, primary jacket portion 50 is formed from an extruded medium density polyethylene material, and feature 52 is formed from an extruded thermoplastic elastomer material (TPE). In one embodiment, the TPE material may be Affinity GA 1950, available from the Dow Chemical Company.

In the embodiments of cable 10 in which the modulus of feature 52 is less than the modulus of primary jacket portion 50, the thickness of feature 52 may be equal to or greater than the thickness of overlap portion 40 because in some such embodiments split formation is resisted via compliance of feature 52, such as via stress isolation thereby. In such embodiments, the thickness, T1, (i.e., the radial dimension in the circular embodiment of FIG. 3) of feature 52 is between 0.5 mm and 1.1 mm. In such embodiments, thickness, T2, of overlap 40 is between 0.2 mm and 1.1 mm. In a specific embodiment, armor layer 30 is formed from a corrugated metal material and thickness, T2, is between 0.6 mm and 1.2 mm, and more specifically is between 0.78 mm and 1.04 mm. In another specific embodiment, armor layer 30 is formed from a non-corrugated metal material, and thickness, T2, is between 0.2 mm and 0.4 mm, and more specifically is between 0.28 mm and 0.34 mm.

In addition to providing split resistance via feature 52, cable jacket 12 may include a plurality of additional elongate members, shown as access features 70 and 72. In general access features 70 and 72 are elongate members or structures embedded within the material of primary jacket portion 50 of cable jacket 12. In various embodiments, access features 70 and 72 are contiguous members that extend the length of cable jacket 12 between the first and second ends of the cable.

In general, primary jacket portion 50 is made from a first material, and access features 70 and 72 are made from a second material that is different from the first material. The difference in materials provides a discontinuity or weakness within cable jacket 12 at the location of access features 70 and 72. These discontinuities provide an access point that allows a user of cable 10 to split cable jacket 12 when access to optical fibers 18 is desired. In various embodiments, access features 70 and 72 may be formed from a material (e.g., a polypropylene/polyethylene blend as discussed above) with low bonding relative to the material of primary jacket portion 50 that allows for jacket splitting by the user.

In various embodiments, access features 70 and 72 and split resistant feature 52 may be formed (e.g., coextruded) as described in US 2013/0051743, filed Oct. 25, 2012, which is incorporated herein by reference in its entirety.

In various embodiments as shown in FIG. 2, access features 70 and 72 are formed from the same material as feature 52, and access feature 70 is contiguous with feature 52 such that access feature 70 and feature 52 form a single, continuous elongated member extending the length of cable 10. In this embodiment, access feature 70 and feature 52 may be extruded together in a single extrusion process. In this embodiment, outer surface 62 of feature 52 is continuous with outer surface 74 of access feature 70, and section 60 of primary jacket portion 50 is located above both outer surface 74 and outer surface 62. In various embodiments, the thickness, T3, of contiguous features 52 and 70 is the distance from inner surface 54 to the outer most point of surface 74, and the thickness, T4, of primary jacket portion 50 is the distance between the inner surface of primary jacket portion 50 and outer surface 58. In various embodiments, T3 is at least about 30% (such as at least a third) and/or no more than about 95% (such as less than all) of T4 (on average), such as between 50% and 95% of T4, specifically is between 70% and 90% of T4, and more specifically is between 80% and 90% of T4. In a specific embodiment, T3 is about 85% of T4.

In various embodiments, the thickness T4 of primary jacket portion 50 is between 0.5 mm and 5 mm, specifically between 1.0 mm and 2.0 mm, and more specifically is between 1.0 mm and 1.5 mm. In a specific embodiment, the thickness T4 of primary jacket portion 50 is about 1.3 mm. In such embodiments, the thickness T3 of contiguous features 52 and 70 is between 0.4 mm and 4.5 mm, specifically is between 1.0 mm and 1.8 mm and more specifically is between 1.1 mm and 1.5 mm. In a specific embodiment, the thickness T4 of primary jacket portion 50 is about 1.3 mm, and the thickness T3 of contiguous features 52 and 70 is about 1.1 mm.

In various embodiments, features 52, 70 and 72 may be formed from a polypropylene/polyethylene blended polymer material as discussed above, and in such embodiments, primary jacket portion 50 may be formed from a medium-density polyethylene material. In such an embodiment, the low bonding of the material of contiguous features 52 and 70 with the material of primary jacket portion 50 may function to limit split propagation past interface 56 as discussed above, and the low bonding of the material features 70 and 72 with the material of primary jacket portion 50 allows for splitting of jacket 12.

In other embodiments, access features 70 and 72 may be formed from a first material and feature 52 may be formed from a different second material. In one such embodiment, access features 70 and 72 may be formed from a material with low bonding relative to the material of primary jacket portion 50 that allows for jacket splitting by the user (e.g., a polypropylene/polyethylene blend as discussed above), and feature 52 may be formed from a compliant material such as a TPE material. In this embodiment, an interface 78 (shown by the dotted line in FIG. 3) may be present between split resistant feature 52 and access feature 70.

As shown in FIG. 3, the width W3 of access feature 70 (e.g., maximum tangential dimension) is less than width W1 of inner surface 54 of split resistant feature 52. In various embodiments, W3 is between 0.1 mm and 0.5 mm, specifically between 0.2 mm and 0.4 mm, and more specifically is about 0.3 mm. As discussed above, in various embodiments, W1 is between 1 mm and 20 mm and specifically between 3 mm and 10 mm, and W2 is between 2 mm and 10 mm and specifically is between 3 mm and 5 mm. In various embodiments W1 is between 5 times and 50 times greater than W3, and specifically is between about 10 times and 20 times greater than W3.

In the embodiment shown in FIG. 2, both access feature 70 and split resistant feature 52 are located generally at the 12 o'clock position, and access feature 72 is located approximately 180 degrees from feature 70 at the 6 o'clock position. Spacing access features 70 and 72 by 180 degrees may allow for maximized access to fibers 18 following jacket splitting.

Figure 4:
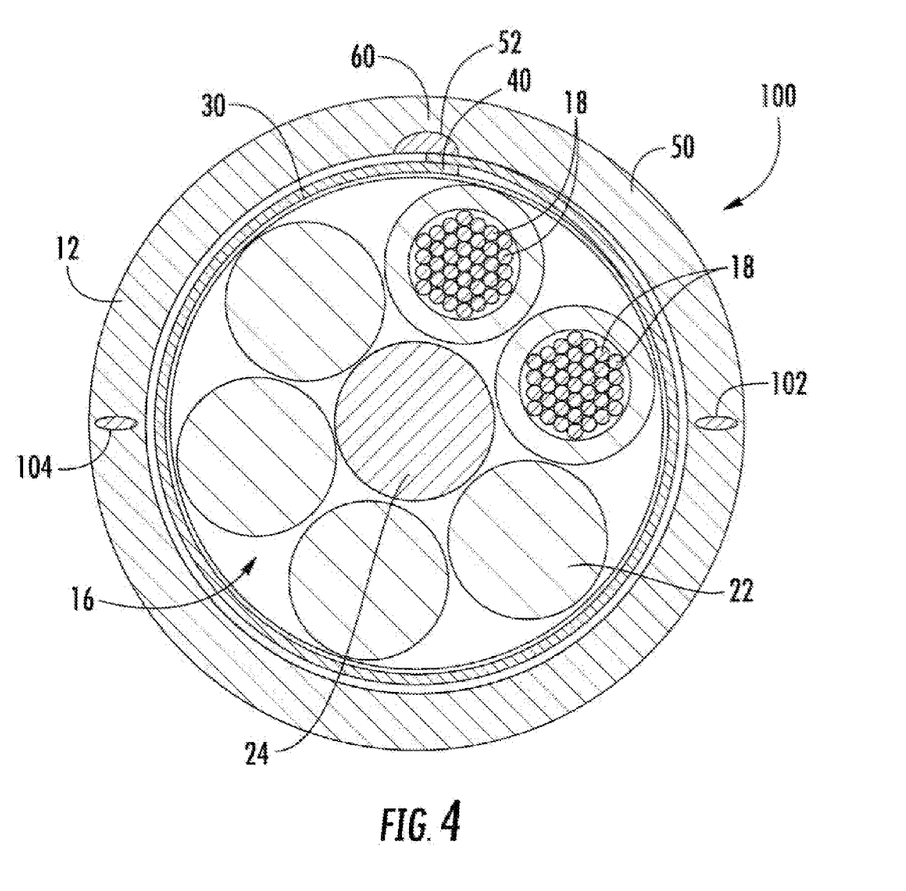
FIG. 4 is a cross-sectional view of a fiber optic cable according to another exemplary embodiment.

Referring to FIG. 4, a cable 100 is shown according to an exemplary embodiment. Cable 100 is substantially similar to cable 10 except as discussed herein. Cable 100 includes access features 102 and 104 embedded within the material of primary jacket portion 50. In this embodiment, access features 102 and 104 function same as features 70 and 72 discussed above except that they are spaced apart from feature 52. In the specific embodiment shown, feature 52 is located at the 12 o'clock position aligned with and adjacent armor overlap 40, access feature 102 is located approximately 90 degrees clockwise from feature 52 at the 3 o'clock position, and access feature 104 is located approximately 270 degrees clockwise from feature 52 at the 9 o'clock position.

Figure 5:
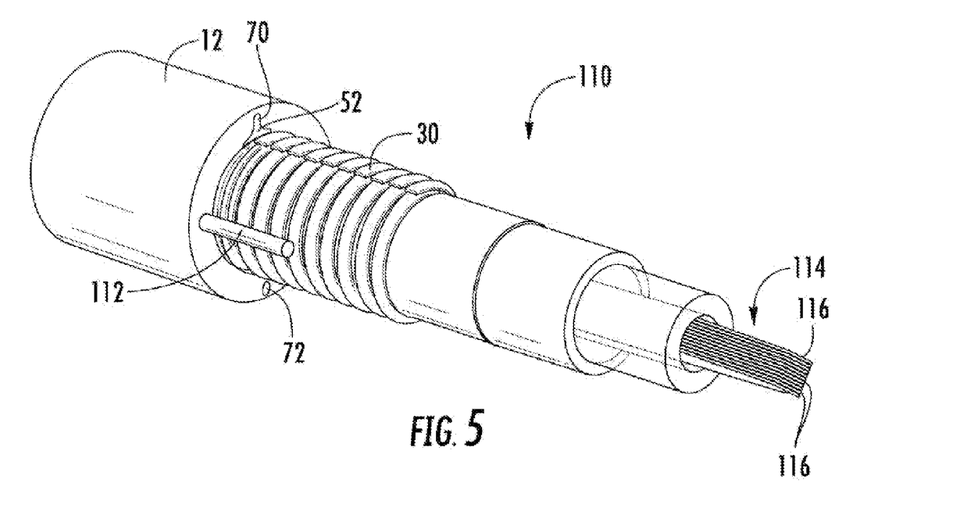
FIG. 5 is a perspective view of a fiber optic cable according to an exemplary embodiment.

Referring to FIG. 5, a cable 110 is shown according to an exemplary embodiment. Cable 110 includes split resistant feature 52 and access features 70 and 72 located within cable jacket 12 and is substantially similar to cable 10 except as discussed herein. Cable 110 includes an elongate strengthening member, shown as rod 112, located within cable jacket 12 that runs the length of cable jacket 12. Rod 112 is formed from a material that is more rigid than the material of cable jacket 12. In various embodiments, the strengthening member is metal, braided steel, glass reinforced plastic, fiber glass, fiber glass yarns or other suitable material. Cable 110 includes a stack 114 of a plurality of optical transmission elements, shown as fiber optic ribbons 116, located within the channel of cable jacket 12.

Figure 6:
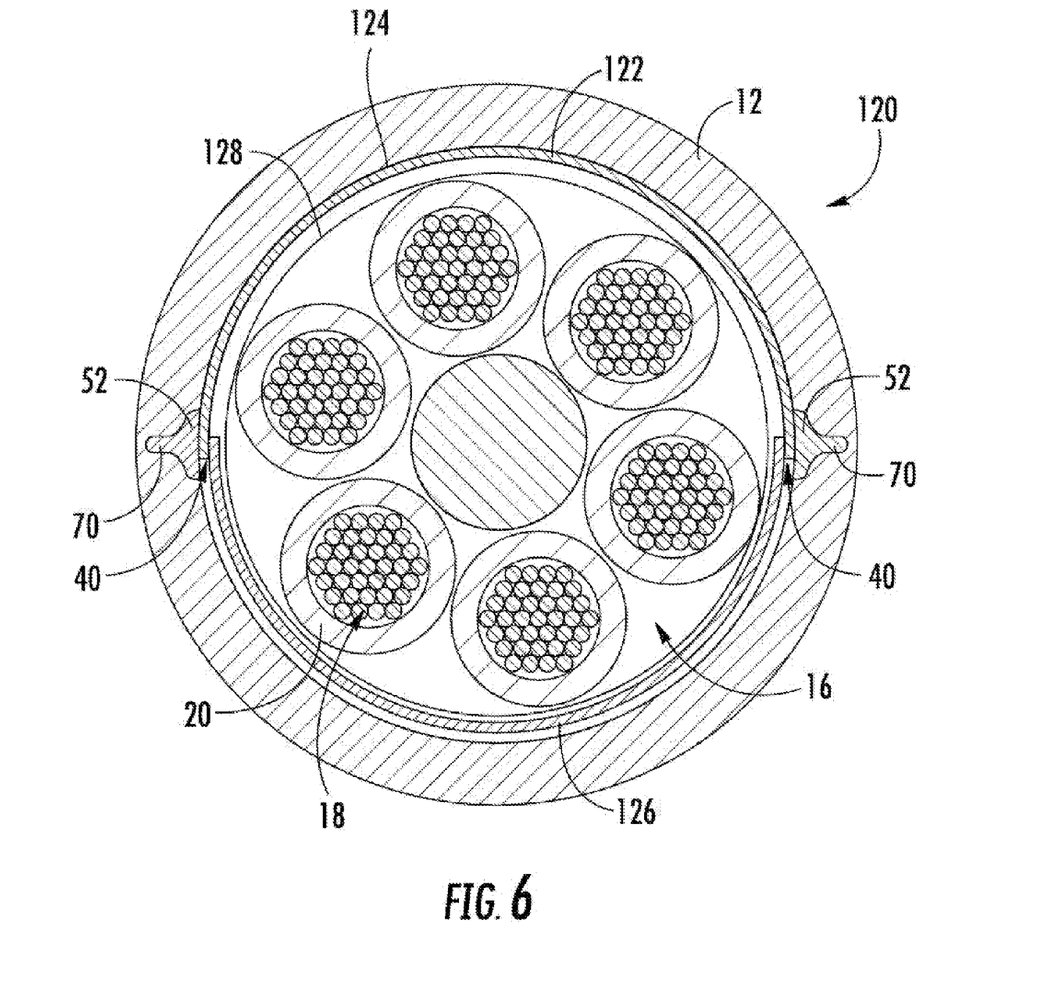
FIG. 6 is a cross-sectional view of a fiber optic cable according to another exemplary embodiment.

Referring to FIG. 6, a cable 120 is shown according to an exemplary embodiment. Cable 120 is substantially similar to cable 10 except as discussed herein. Cable 120 includes two split resistant features 52, and two access features 70 contiguous with each feature 52. In the embodiment shown, cable 120 includes a two-part armor layer 122 (e.g., clam shell armor layer) including two armor overlap portions 40. Split resistant features 52 and access features 70 are located adjacent to overlap portions 40. In this embodiment, armor layer 122 includes a first section 124 and a second section 126. In the embodiment shown, first section 124 and second section 126 are semi-cylindrical or arch-shaped elements with second section 126 received partially within first section 124 creating overlap portions 40. In other embodiments, the first section may be outside the second section on one side and vice versa on the other. Use of two split resistant features 52 may also facilitate tearing of a section of the jacket therebetween to assist accessing the contents of the cable 120.

In this embodiment, both of the access features 70 are positioned aligned with overlap sections 40. This positioning allows cable jacket 12 to be opened and for armor layer 122 to be opened (e.g., by separating first armor section 124 from second armor section 126) at the same time or with the same opening action that opens cable jacket 12.

In some such embodiments, a bonding agent (e.g., chemical bonding agent such as Maleic anhydride, ethylene acrylic acid copolymer; flame treatment changing the surface chemistry; surface roughening increasing the surface area) may be used in or adjoining cable jacket 12 to increase bonding between the inner surface of cable jacket 12 and the outer surface of armor layer 122, between either or both of the first and second sections 124, 125 and the jacket. The bonding between cable jacket 12 and armor layer 122 may facilitate removal of both layers together with a single opening action. The bonding agent may also act to prevent relative sliding of edges of two-piece armor layer 122, and the bonding agent may also be used to prevent relative sliding of the components of any of the other embodiments disclosed herein. The bonding agent may be mixed in the primary jacketing material, positioned on the surface of the armor, or both.

In one embodiment, cable 120 includes a binder layer, shown as thin-film binder 128, positioned around buffer tubes 20. Generally, thin-film binder 128 is a material layer surrounding and binding together buffer tubes 20 within central channel 16. In one embodiment, cable 120 and/or thin-film binder 128 may be binders/cables as disclosed in U.S. application Ser. No. 13/790,329, filed Mar. 8, 2013, which is incorporated herein by reference in its entirety. In some embodiments, the outer surface of binder 128 is bonded to the inside surface of armor layer 122 (e.g., with glue, bonding agent, chemical adhesion) so that the access features 70 may be used to tear open cable jacket 12, armor 122, and binder 128 in a single tearing action to access contents of cable 120 (e.g., buffer tubes 20 of optical fibers 18, a stack of fiber optic ribbons, tight-buffered fibers, or other arrangements of optical fibers). The binder film 128 may also serve as a carrier for water-blocking materials, such as SAP partially embedded on the inside surface of the film 128. The binder film 128 is substantially thinner than a jacket, such as less than a fifth of the jacket 12, less than a tenth, or even less than a twentieth. The binder film 128 may be extruded, and may include polyethylene, polypropylene, or another polymer as the primary constituent thereof. Tension in the binder film 128 may hold the contents of the core together as the binder film 128 cools and contracts following extrusion. In other embodiments, the binder film 128 is not bonded to the armor.

In the embodiments discussed above, primary jacket portion 50 is formed from a single layer of extruded polymer material (e.g., a medium-density polyethylene material), and in other embodiments, jacket 12 may include multiple layers of materials. In various embodiments, primary jacket portion 50 may be a variety of materials used in cable manufacturing such as polyvinyl chloride (PVC), polyvinylidene difluoride (PVDF), nylon, polyester or polycarbonate and their copolymers. In addition, the material of primary jacket portion 50 may include small quantities of other materials or fillers that provide different properties to the material of primary jacket portion 50. For example, the material of primary jacket portion 50 may include materials that provide for coloring, UV/light blocking (e.g., carbon black), burn resistance, etc.

Figure 7:
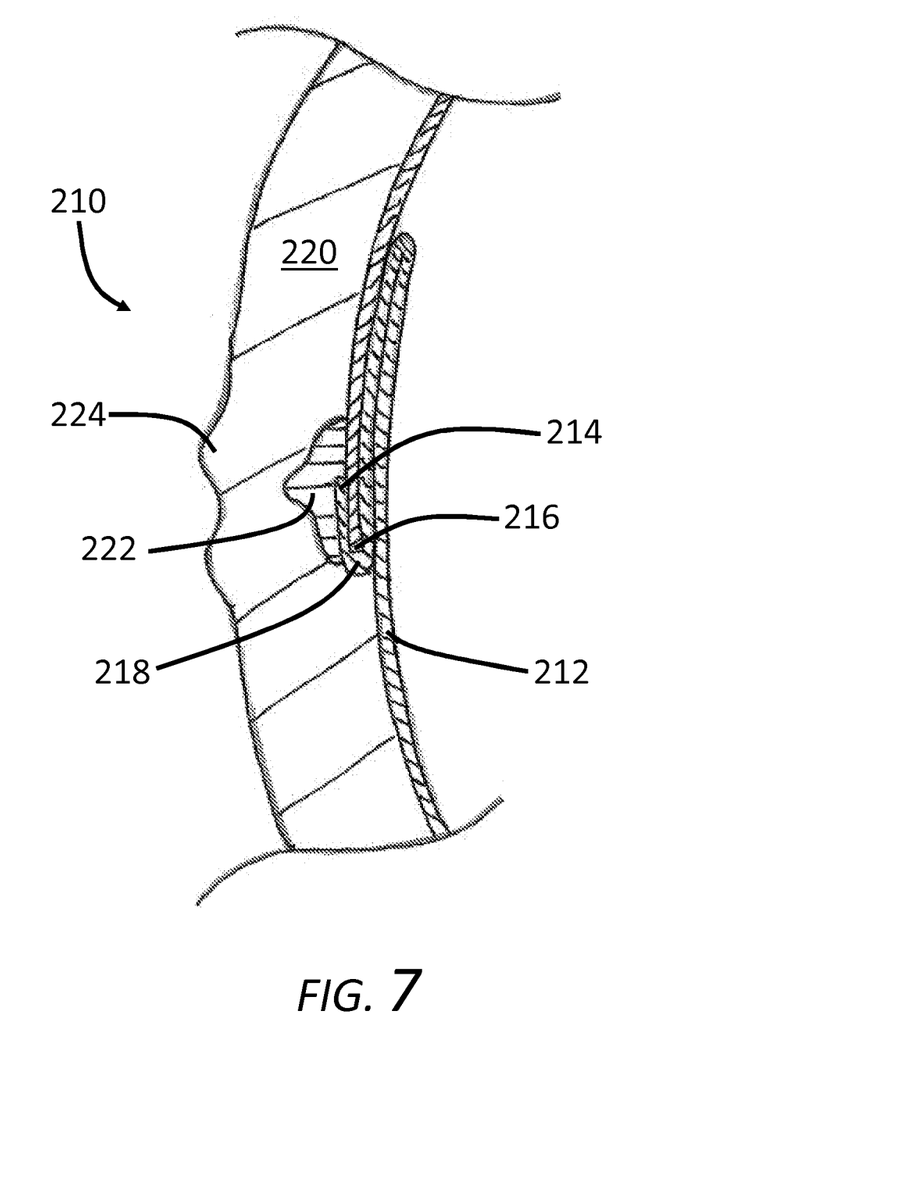
FIG. 7 is a cross-sectional view of an interface of armor according to another exemplary embodiment.

Referring now to FIG. 7, an interface 210 between lateral edges 214, 216 of armor 212 is shown. The lateral edges 214, 216 may be from the same armor sheet (see generally FIG. 2), or from separate armor sheets (see generally FIG. 6). According to an exemplary embodiment, the interface 210 includes a seat 218 in which one of the lateral edges 216 is held. A jacket 220 holds the lateral edge 216 in the seat 218 during operation of the corresponding cable. However, the seat 218 also allows the lateral edge 216 to be withdrawn from the seat 218 (vertically as shown in FIG. 7), such as with minimal resistance from the seat 218 itself (e.g., less than 15 N per meter length), such as if the jacket 220 is pulled apart from the inside, where the lateral edges are drawn apart in opposite directions tangential to the interface. Put another way, the seat 218 may lock the lateral edges 214, 216 together in some degrees of freedom, such as preventing relative rotations, relative radial translation (in the horizontal direction of FIG. 7), and relative lengthwise translation (limited via aligned corrugations between the overlaying pieces of armor 212, into and out of FIG. 7), but may allow relative tangential translation (i.e., pulling apart, in the vertical direction of FIG. 7).

In such an embodiment, the interface 210 may also be aligned with tear features and/or anti-zipper features 222 in the jacket 220, which mitigate the likelihood of inadvertent zippering and/or also may facilitate purposeful tearing open of the jacket 220. The net force to pull the jacket 220 and armor 212 apart may be less than 80 N to initiate a tear through the jacket 220 along the tear features and/or antizipper features 222 on a free end of the cable. As shown in FIG. 7, visual and/or tactile indicia on the exterior of the respective cable (e.g., either cable in FIGS. 2 and 6) may help users locate the interface 210. The indicia may include raised portions 224 of the jacket 220, such as bumps or elongate ridges on the jacket 220.

While the specific cable embodiments discussed herein and shown in the figures relate primarily to cables that have a substantially circular cross-sectional shape defining substantially cylindrical internal lumens, in other embodiments, the cables discussed herein may have any number of crosssection shapes. For example, in various embodiments, cable jacket 12 may have a square, rectangular, triangular or other polygonal cross-sectional shape. In such embodiments, the channel or bore of the cable may be the same shape or different shape than the shape of cable jacket 12. In some embodiments, cable jacket 12 may define more than one channel. In such embodiments, the multiple channels may be of the same size and shape as each other or each may have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In some contemplated embodiments, jackets and armor disclosed herein may be used with cables and conduits, such as ducts or conductive-copper carrying cable, where optical fibers may not be included.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable, comprising:
a jacket including an elongate member embedded in a first material such that the first material and the elongate member form a cohesive composite, wherein the jacket is mostly formed from the first material such that the jacket is greater than 50% the first material by volume, wherein the elongate member is formed from a second material embedded in the first material of the jacket, and wherein the jacket defines a channel therein;
a plurality of optical transmission elements located within the channel; and
armor comprising a wrapped sheet having a lateral edge on a side of the sheet, the armor positioned around the plurality of optical transmission elements within the channel of the jacket; and
wherein the elongate member of the jacket has an inner surface aligned with and located exterior to the lateral edge of the armor, and wherein, when viewed in cross-section, the elongate member fully overlays the lateral edge of the armor and extends tangentially therebeyond, whereby the elongate member provides an obstacle in the jacket that limits split initiation associated with the lateral edge or split propagation through the jacket originating therefrom.

2. The optical communication cable of claim 1, wherein, when viewed in cross-section, the elongate member overlays the lateral edge and extends at least 2% and less than 15% of the perimeter of the channel tangentially beyond the lateral edge on either side thereof.

3. The optical communication cable of claim 1, wherein, when viewed in cross-section, the width of the inner surface of elongate member overlaying the lateral edge of the armor is between at least 2 mm and no more than 10 mm.

4. The optical communication cable of claim 3, wherein the inner surface of the elongate member is radially 1 mm or less from direct contact with the lateral edge of the armor or is in direct contact therewith.

5. The optical communication cable of claim 4, wherein the elongate member extends radially through the jacket a distance that is at least a third of the average thickness of the jacket, facilitating tearing of the jacket therealong to assist accessing the plurality of optical transmission elements located within the channel.

6. The optical communication cable of claim 4, wherein the jacket includes an inner surface that partially defines the channel and wherein the inner surface of the elongate member also partially defines the channel, and wherein the inner surface of the elongate member contacts the lateral edge of the armor.

7. The optical communication cable of claim 4, wherein the elongate member is a first elongate member, the jacket further comprising a second elongate member embedded in the first material of the jacket such that the jacket, the first elongate member and the second elongate member form a cohesive composite, wherein the second elongate member is formed from the second material, wherein the second elongate member is positioned apart from the first elongate member around the periphery of the jacket and along with the first elongate member facilitates tearing of a section of the jacket therebetween to assist accessing the plurality of optical transmission elements located within the channel.

8. The optical communication cable of claim 1, wherein the armor includes corrugated metal, and wherein corrugations on the lateral edge intermesh with corrugations on an adjoining surface of the armor underlying the lateral edge.

9. The optical communication cable of claim 8, wherein the first material is extrudable and has a first polymer as the primary constituent thereof by volume, and wherein second material is co-extrudable with the first material and has a second polymer as the primary constituent thereof by volume.

10. The optical communication cable of claim 9, wherein the modulus of elasticity of the first material is between 100 and 800 MPa and the modulus of elasticity of the second material is no more than half that of the first material.

11. The optical communication cable of claim 9, wherein the second material comprises the second polymer and at least one of a plasticizer and a filler.

12. An optical communication cable, comprising:
at least one optical transmission element;
armor having a lateral edge, the armor wrapped around the at least one optical transmission element such that the lateral edge overlaps another portion of the armor creating an overlapped portion; and
a cohesive composite jacket comprising:
a main portion formed from a first material and including an inner surface and an outer surface, the outer surface defining an exterior of the jacket; and
a secondary portion formed from a second material and including an inner surface, the secondary portion embedded within the main portion;
wherein the jacket defines a channel extending therethrough, and wherein the plurality of optical transmission elements and the armor are located within the channel of the jacket;
wherein the secondary portion extends only part of the distance between the channel and the outer surface of the jacket such that a section of the main portion is located between the secondary portion and the outer surface of the jacket; and
wherein the inner surface of the secondary portion is generally aligned with the overlapped portion of the armor such that the inner surface of the secondary portion is located between the overlapped portion of the armor and the outer surface of the jacket and, when viewed in cross-section, overlays the lateral edge of the armor and extends at least 2% and less than 15% of the perimeter of the channel tangentially beyond the lateral edge on either side thereof.

13. An optical communication cable, comprising:
(A) a core of the cable, comprising core elements comprising one or more optical fibers;
(B) armor surrounding the core, the armor comprising two or more separate armor pieces each having a lateral edge joined to another of the separate armor pieces at corresponding interfaces to combine the separate armor pieces and form the armor, wherein the interfaces seat the lateral edges of joined separate armor pieces together in less than all degrees of freedom such that the respective separate armor pieces may be pulled tangentially apart from one another and away from the seating; and (C) a jacket surrounding the armor, wherein the jacket holds the separate armor pieces together, the jacket comprising:
  (i) a main portion formed from a first extrudable polymer material and including an inner surface and an outer surface; and
  (ii) secondary portions formed from a second extrudable polymer material and embedded within the main portion, wherein the main portion and the secondary portions are coextruded with each other, wherein the secondary portions respectively overlay the interfaces of the separate armor pieces, and wherein the secondary portions mitigate zippering associated with the corresponding interfaces and support single-step core access by facilitating tearing open of the jacket about the interfaces as the separate armor pieces are pulled tangentially apart from one another.

14. The optical communication cable of claim 13, wherein the main portion of the jacket is tightly bonded to the armor, facilitated by a chemical bonding agent.

15. The optical communication cable of claim 13, wherein the separate armor pieces are two pieces and there are only two interfaces at adjoining lateral edges of the two pieces on opposite sides of the two pieces, wherein one of the separate armor pieces is deformed to provide the seat for the other at each of the two interfaces such that the two separate armor pieces are crimped together at the interfaces.

16. The optical communication cable of claim 13, wherein the core further comprises a central strength member, wherein the core elements comprise buffer tubes surrounding subsets of the one or more optical fibers, and wherein the buffer tubes are stranded around the central strength member in a pattern of stranding including reversals in lay direction of the buffer tubes.

17. The optical communication cable of claim 16, further comprising: (D) a binder film surrounding the core interior to the armor, wherein, on average, the jacket is at least five times thicker than the binder film.

18. The optical communication cable of claim 17, wherein the binder film is continuous peripherally around the core elements, forming a continuous closed loop when viewed in cross-section, and continuous lengthwise along a length of the cable that is at least 10 meters.

19. The optical communication cable of claim 18, further comprising: (E) water-absorbing powder particles positioned on an interior surface of the binder film, between the binder film and the core elements, wherein at least some of the powder particles are partially embedded in the binder film having a portion thereof submerged in the binder film and another portion thereof exposed.

20. The optical communication cable of claim 19, wherein the binder film is bonded to an interior of the armor, thereby providing quick access to the core via simultaneous removal of the binder film when the armor and jacket are removed.

* * * * *